(12) United States Patent
Kobayashi et al.

(10) Patent No.: US 9,166,384 B2
(45) Date of Patent: Oct. 20, 2015

(54) SWITCHGEAR

(75) Inventors: Hirotsugu Kobayashi, Tokyo (JP);
Kazufumi Kondo, Tokyo (JP); Ryozo Hosoya, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 264 days.

(21) Appl. No.: 14/004,754

(22) PCT Filed: Aug. 17, 2011

(86) PCT No.: PCT/JP2011/068603
§ 371 (c)(1),
(2), (4) Date: Sep. 12, 2013

(87) PCT Pub. No.: WO2012/147218
PCT Pub. Date: Nov. 1, 2012

(65) Prior Publication Data
US 2014/0002961 A1    Jan. 2, 2014

(30) Foreign Application Priority Data

Apr. 28, 2011 (JP) .................................. 2011-100983

(51) Int. Cl.
*H02B 13/00* (2006.01)
*H02B 7/00* (2006.01)
(Continued)

(52) U.S. Cl.
CPC ................ *H02B 13/005* (2013.01); *H02B 1/54* (2013.01); *H02B 7/00* (2013.01); *H02B 13/02* (2013.01); *H02B 1/301* (2013.01)

(58) Field of Classification Search
None
See application file for complete search history.

(56) References Cited

U.S. PATENT DOCUMENTS 6,365,826 B1 * 4/2002 Stendardo et al. ......... 174/17 VA
7,236,352 B2 * 6/2007 Dalis ............................ 361/608
(Continued)

FOREIGN PATENT DOCUMENTS

CN          1765039 A       4/2006
JP          53-154326 U     12/1978
(Continued)

OTHER PUBLICATIONS

Office Action (Notice of Preliminary Rejection) issued on Dec. 30, 2014, by the Korean Patent Office in corresponding Korean Patent Application No. 10-2013-7023999, and an English Translation of the Office Action. (5 pages).

(Continued)

*Primary Examiner* — Courtney Smith
(74) *Attorney, Agent, or Firm* — Buchanan Ingersoll & Rooney PC

(57) ABSTRACT

A housing of a switchgear includes: a framework formed by joining vertical frames to depth directional frames and width directional frames, the vertical frames being arranged in a standing condition at four corners of a cuboid shape; at least a left and right pair of intermediate vertical frames each provided at an intermediate portion in the depth direction; and steel partition plates fixed over the whole in the vertical direction of the intermediate vertical frames, the partition plates being provided for separating the front and the back of the intermediate vertical frames. Then, the depth directional frame on the floor side is formed with a fixing hole near a lower portion of the intermediate vertical frame, the fixing hole being provided for fixing the housing to a foundation surface.

5 Claims, 5 Drawing Sheets

(51) Int. Cl.
*H02B 1/54* (2006.01)
*H02B 13/02* (2006.01)
*H02B 1/30* (2006.01)

(56) References Cited

U.S. PATENT DOCUMENTS

| | | | | |
|---|---|---|---|---|
| 8,492,662 | B2* | 7/2013 | Ballard et al. | 174/522 |
| 2009/0200273 | A1* | 8/2009 | Josten et al. | 218/157 |
| 2009/0212022 | A1* | 8/2009 | Josten et al. | 218/157 |

FOREIGN PATENT DOCUMENTS

| | | |
|---|---|---|
| JP | 56-158606 U | 11/1981 |
| JP | 58-46807 A | 3/1983 |
| JP | 61-10004 U | 1/1986 |
| JP | 64-002502 U | 1/1989 |
| JP | 04-034154 A | 2/1992 |
| JP | 05-060111 U | 8/1993 |
| JP | 07-212925 A | 8/1995 |
| JP | 07-336818 A | 12/1995 |
| JP | 08-280107 A | 10/1996 |
| JP | 10-257612 A | 9/1998 |
| JP | 10-285717 A | 10/1998 |
| JP | 11-098625 A | 4/1999 |
| JP | 2003-293487 A | 10/2003 |
| KR | 10-1027917 B1 | 4/2011 |

OTHER PUBLICATIONS

International Search Report (PCT/ISA/210) mailed on Nov. 8, 2011, by the Japanese Patent Office as the International Searching Authority for International Application No. PCT/JP2011/068603.

Japanese Office Action issued Nov. 6, 2012 in Patent Application No. 2012-541267.

Office Action (First Office Action) issued on Feb. 28, 2015, by the State Intellectual Property Office of the People's Republic of China in corresponding Chinese Patent Application No. 201180069993.2, and an English Language Translation of the Office Action. (9 pages).

* cited by examiner (a)  (b)  (c)

SWITCHGEAR

TECHNICAL FIELD

The present invention relates to a switchgear for use in, for example, electric power transmission/distribution and reception facilities and, more particularly, relates to a housing structure of the switchgear.

BACKGROUND ART

There is disclosed a housing structure in which, for example, as shown in FIG. 8, hollow steel members are used for major welding framework steel members to which L-shaped steel members in cross section and channel-shaped steel members in cross section are combined, as a technique for a conventional switchgear taking into account quake resistant performance. More specifically, height directional hollow steel members 41, width directional hollow steel members 42, and depth directional hollow steel members 43 are combined with L-shaped foundation steel members in cross section 44 arranged in the depth direction of a foundation portion of the housing; and further, these members are appropriately combined with channel-shaped steel members in cross section and the whole is welded and joined to form a framework of the housing, thereby achieving an improvement in rigidity. Welding panels 45 are attached to outer surfaces (for example, see, Patent Document 1).

RELATED ART DOCUMENT

Patent Document

Patent Document 1: Japanese Unexamined Utility Model Publication No. 61-10004 (Page 2, FIG. 2)

DISCLOSURE OF THE INVENTION

Problems to be Solved by the Invention

In a conventional housing structure as shown in Patent Document 1, when the height, width, and depth of the switchgear increase and/or when the weight of main circuit devices such as a circuit breaker to be mounted on the switchgear increases, rigidity of the housing lowers and it is likely to be difficult to secure quake resistant performance.

An addition of steel members serving as the framework and an increase in size of the steel member are conceivable, as means for improving the rigidity of the housing; however, this leads to an increase in weight and an enlargement in size of the housing and thus a negative influence is given for an improvement in rigidity. Furthermore, a problem exists in that the addition of the steel members and the increase in size of the steel members lead to an increase in material and working hours and thus an increase in costs is caused.

The present invention has been made to solve the problem as described above, and an object of the present invention is to provide a switchgear which can secure necessary rigidity and is excellent in quake resistance even when the dimensions of a housing increase and the weight of main circuit devices to be mounted increases.

Means for Solving the Problems

According to the present invention, there is provided a switchgear in which main circuit devices including circuit breakers and a control device for controlling the main circuit devices are contained in a cuboid shaped housing. In the switchgear, the housing includes: a framework formed by joining vertical frames to depth directional frames and width directional frames, the vertical frames being arranged in a standing condition at four corners of a cuboid shape; at least a left and right pair of intermediate vertical frames each provided at an intermediate portion in the depth direction of the housing; and steel partition plates fixed over the whole in the vertical direction of the intermediate vertical frames, the partition plates being provided for separating the front and the back of the intermediate vertical frames. The intermediate vertical frames and the partition plates are integrated to constitute a reinforcement member; and the depth directional frames on the floor side of the housing are each formed with a fixing portion near a lower portion of at least the intermediate vertical frame to which the partition plates are provided, the fixing portion being provided for fixing the housing to a foundation surface.

Advantageous Effect of the Invention

According to the switchgear of the present invention, the housing includes: at least the left and right pair of the intermediate vertical frames each provided at the intermediate portion in the depth direction of the housing; and the steel partition plates fixed over the whole in the vertical direction of the intermediate vertical frames, the partition plates being provided for separating the front and the back of the intermediate vertical frames. The intermediate vertical frames and the partition plates are integrated to constitute a reinforcement member; and the depth directional frames on the floor side of the housing are each formed with the fixing portion near the lower portion of at least the intermediate vertical frame to which the partition plates are provided, the fixing portion being provided for fixing the housing to the foundation surface. Therefore, even when the dimensions and weight of the switchgear increase, a significant addition of framework members and an increase in size of the framework members are suppressed and rigidity of the housing can be maintained; and thus, an increase in cost can be suppressed and the switchgear excellent in quake resistance can be obtained.

MODE FOR CARRYING OUT THE INVENTION

Embodiment 1

Figure 1:
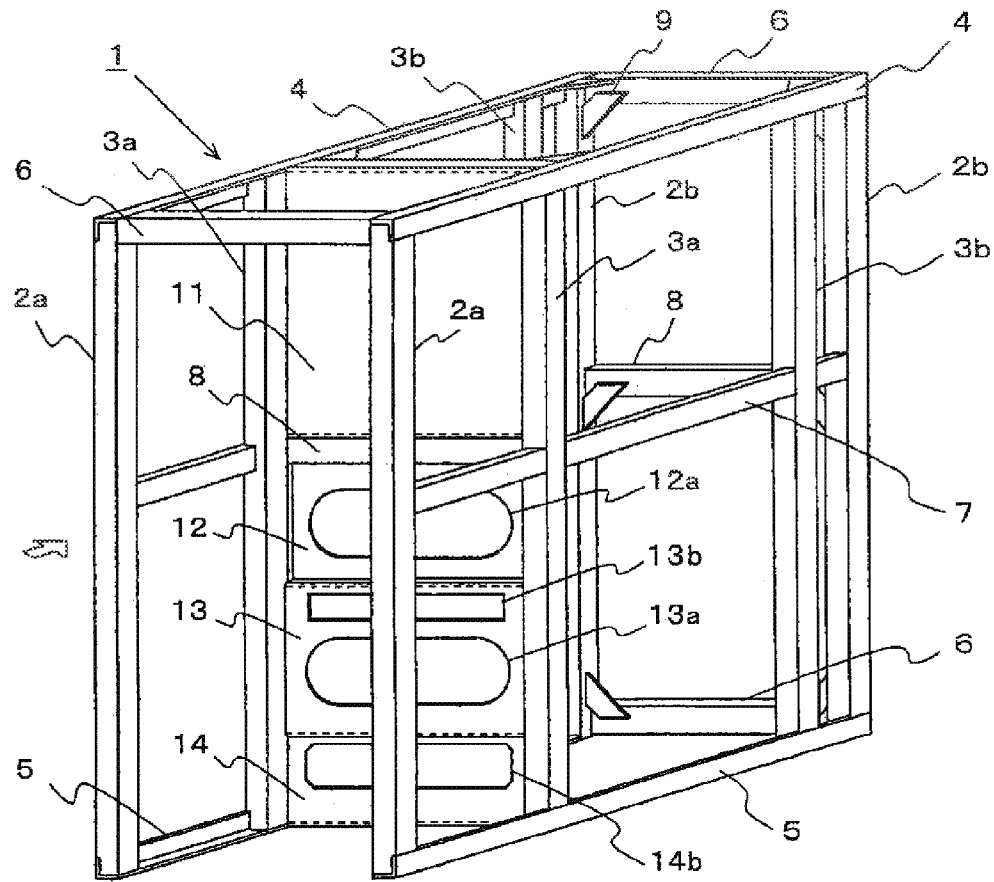
FIG. 1 is a perspective view showing a framework structure of a housing of a switchgear according to Embodiment 1 of the present invention.
Figure 2:
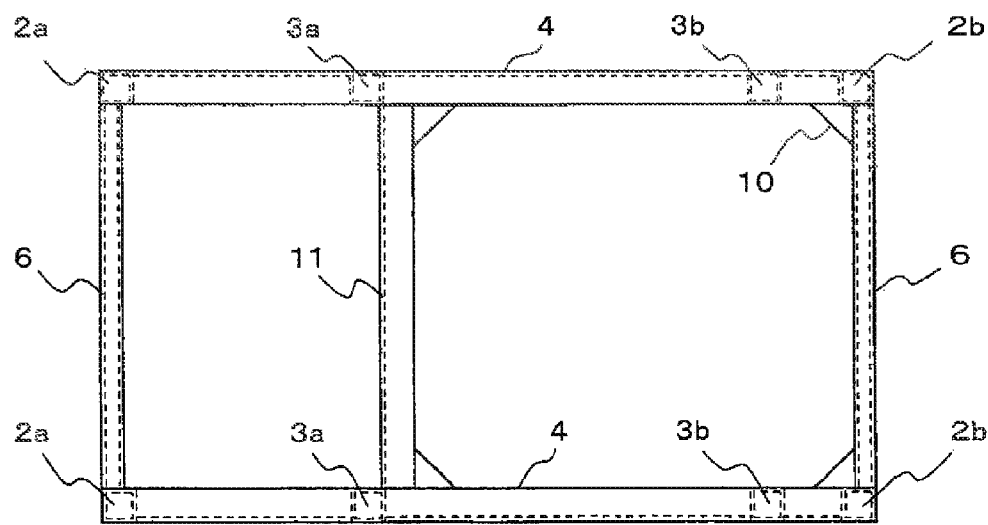
FIG. 2 is a top view of a framework structure of FIG. 1.

FIG. 1 is a perspective view showing a framework structure of a housing of a switchgear according to Embodiment 1 of the present invention; and FIG. 2 is a top view of FIG. 1.

The switchgear includes a substantially cuboid shaped housing 1; and a plurality of main circuit devices which constitute main circuits such as circuit breakers, main bus bars, and main circuit conductors (not shown) and a control device which controls the main circuit devices are contained inside the housing 1. Generally, the inside of the housing is partitioned into a control device compartment, a circuit breaker compartment, a main bus bar compartment, and the like; and the respective devices are arranged therein.

More particularly, the present invention has a feature in a framework structure which constitutes the housing of the switchgear; and therefore, first, description will be made from the framework structure by FIG. 1 and FIG. 2.

Incidentally, in FIG. 1, the side viewed in the direction of a left thick arrow is the front side; and therefore, in the following description, expressions of the front, back, left and right, side, width direction, depth direction, and the like are based on the front side.

In FIG. 1 and FIG. 2, a framework frame which constitutes the housing 1 is arranged with vertical frames 2a, 2b, which are each made of a hollow steel member of a rectangular shape in cross section, in the vertical direction of four corners of the cuboid shaped housing 1; and intermediate vertical frames 3a, 3b, which are each made of a hollow steel member of a rectangular shape in cross section, are arranged toward the vertical direction at an intermediate portion in the depth direction of the left and right sides of the housing 1. In order to join these frames, depth directional frames 4, which are each made of an L-shaped steel member in cross section, are arranged on the left and the right of the ceiling side; depth directional frames 5, which are each made of an L-shaped steel member in cross section, are arranged on the left and the right of the floor side; and width directional frames 6, which are each made of a hollow steel member of a rectangular shape in cross section, are arranged in the width direction.

Further, intermediate depth directional frames 7 and intermediate width directional frames 8 are arranged at an intermediate portion in the vertical direction; and these frames are integrally jointed by welding or the like to form a main framework of the housing 1.

Incidentally, a reinforcement plate 9 is provided at each joint portion between the rear side vertical frame 2b and the width directional frame 6 and between the rear side vertical frame 2b and the width directional frame 8; and a reinforcement plate 10 is provided at a joint portion between the ceiling side depth directional frame 4 and the width directional frame 6 and the like (see FIG. 2).

Then, a panel (not shown) is attached to a ceiling surface, both side surfaces, and a rear surface; an opening and closing door (not shown) is provided on a front surface; and these components constitute a major portion of the housing 1 of the switchgear.

The feature of the present invention is to provide steel partition plates on the left and right pair of intermediate vertical frames 3a each provided at the intermediate portion in the depth direction of the housing 1 (provided near a central portion); and therefore, next, the configuration of the partition plates will be described.

An upper partition plate 11, a circuit breaker compartment upper partition plate 12, a circuit breaker compartment intermediate partition plate 13, and a circuit breaker compartment lower partition plate 14 are arranged on the intermediate vertical frames 3a in order from the upper side so as to separate spaces of the front and the back of the intermediate vertical frames 3a; and the left and right ends of the partition plates are jointed and fixed to the intermediate vertical frames 3a by welding or the like. A joint portion between the partition plates is also fixed by welding or the like.

The circuit breaker compartment upper partition plate 12 is formed with an opening portion 12a and the circuit breaker compartment intermediate partition plate 13 is formed with an opening portion 13a, the opening portions being provided for attaching bushings (to be described later). Further, the circuit breaker compartment intermediate partition plate 13 is formed with an inspection port 13b and the circuit breaker compartment lower partition plate 14 is formed with an inspection port 14b. A cover (not shown) is usually attached to each of the inspection ports 13b, 14b.

In this manner, the respective partition plates from the upper partition plate 11 to the circuit breaker compartment lower partition plate 14 are provided so as to infill from an uppermost portion to a lowermost portion between the left and right intermediate vertical frames 3a; and therefore, in the case of seeing from the top as shown in FIG. 2, an H-shaped rigidity structure is formed by rigidity members (the vertical frames 2a, 2b, 3a, 3b and the depth directional frames 4, 5 etc.) which constitute the left and right sides and the rigidity members composed of the aforementioned intermediate vertical frames 3a and the respective partition plates (11 to 14 etc.).

The natural frequency of the housing 1 is expected to be improved approximately 20% by such a configuration, as compared to one configured without a partition plate; and therefore, it becomes possible to improve rigidity of the housing 1 of the switchgear without increasing the sizes and cross sectional areas of the frames.

Incidentally, such partition plates 11 to 14 are described by those divided into 4 as shown in the drawing; however, the number of division is not limited to this number and the configuration may be made by one partition plate without being divided.

Furthermore, it may be permissible that a plurality of width directional frames are connected between the left and right intermediate vertical frames 3a and flat plate-shaped steel plates are welded to form partition plates so as to fill in openings formed by the intermediate vertical frames 3a and the width directional frames.

Next, description will be made on the case where the framework of the housing as described by FIG. 1 and FIG. 2 is specifically used as the housing of the switchgear.

Figure 3:
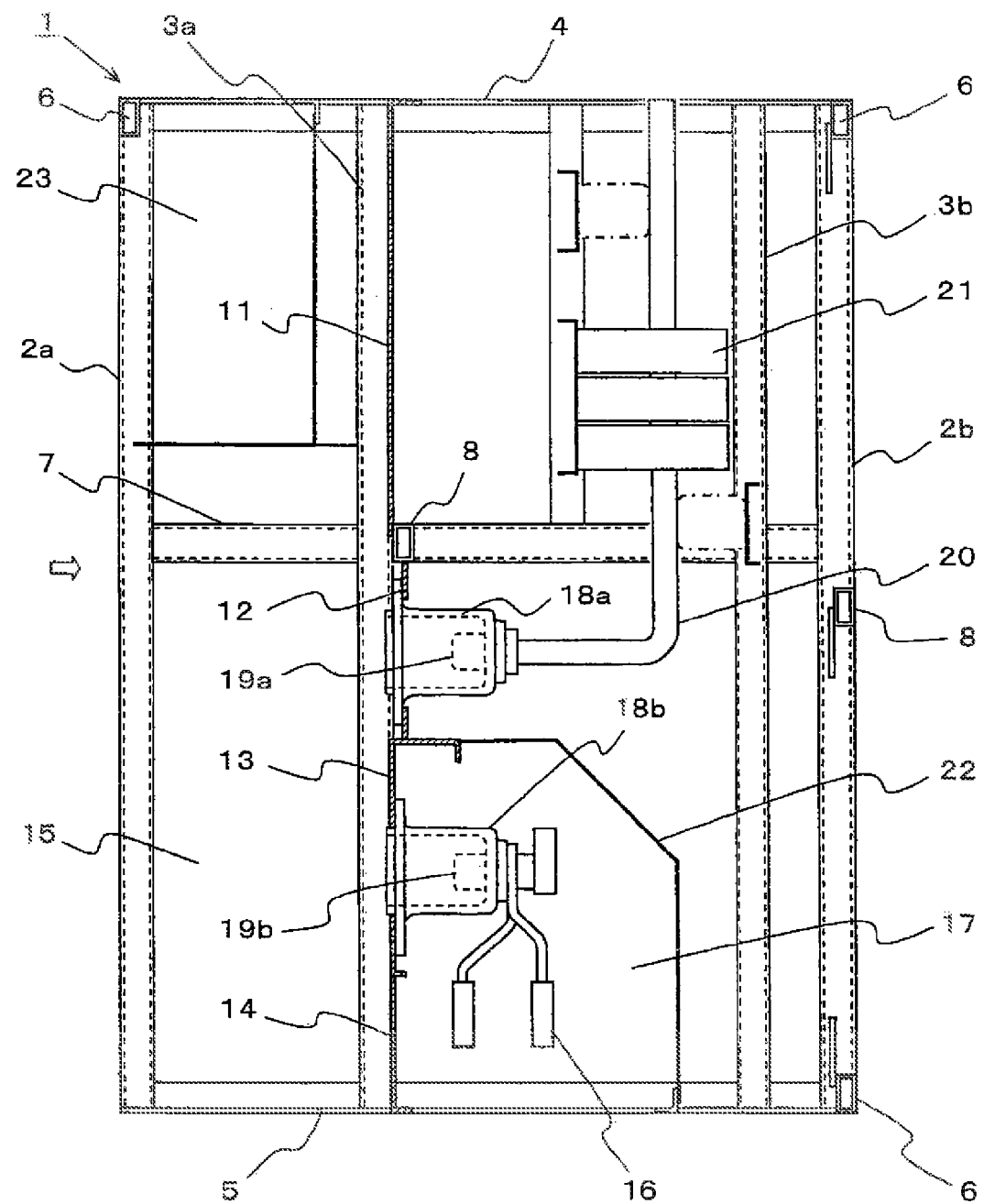
FIG. 3 is a side sectional view showing an internal configuration of the switchgear according to Embodiment 1 of the present invention.

FIG. 3 is a side sectional view of the switchgear in which the housing framework of FIG. 1 is used. The surrounding panels, the front door, and the like are omitted. Furthermore, as for also devices to be contained inside, only portions necessary for the description are shown.

The intermediate vertical frames 3a are arranged at an intermediate portion in the front-back direction of the switchgear where the weight of the main circuit devices mounted on the switchgear is concentrated. Then, the upper partition plate 11, the circuit breaker compartment upper partition plate 12, the circuit breaker compartment intermediate partition plate 13, and the circuit breaker compartment lower partition plate 14 as described before are fixed to the intermediate vertical frames 3a. The more front side than these partition plates is a circuit breaker compartment 15 in which circuit breakers (not shown) such as a vacuum circuit breaker are contained; and the more back side than the partition plates is a main bus bar compartment 17 in which main bus bars 16 are contained.

Upper bushings 18a are attached to the opening portion 12a (see FIG. 1) of the circuit breaker compartment upper partition plate 12. An upper primary terminal 19a is provided so as to penetrate the upper bushing 18a. An upper conductor 20 is connected on the back of the upper primary terminal 19a and the upper conductor 20 passes through an instrument current transformer 21 to be connected to the outside.

Furthermore, lower bushings 18b are attached to the opening portion 13a (see FIG. 1) of the circuit breaker compartment intermediate partition plate 13. A lower primary terminal 19b is provided so as to penetrate the lower bushing 18b and is connected to each of three phase main bus bars 16 on the main bus bar compartment 17 side of the back of the lower primary terminal 19b. A main bus bar compartment partition plate 22 is fastened and fixed on the housing side by bolts or the like so as to cover an upper portion and a back portion of the main bus bar compartment 17. In such a manner, a space formed by being surrounded by the circuit breaker compartment intermediate partition plate 13, the circuit breaker compartment lower partition plate 14, and the main bus bar compartment partition plate 22 is the main bus bar compartment 17.

Although graphic display in the circuit breaker compartment 15 is omitted, for example, a circuit breaker capable of taking out and putting in from the front side is contained; an upper terminal is led out from the upper side of the rear of the circuit breaker; a lower terminal is led out from the lower side; the upper terminal is connected to the upper primary terminal 19a provided so as to penetrate the upper bushing 18a; and the lower terminal is connected to the lower primary terminal 19b provided so as to penetrate the lower bushing 18b.

Furthermore, the upper side of the circuit breaker compartment 15 is a controller compartment 23 in which the control device is contained; and the controller compartment 23 is appropriately separated by being partitioned by partition plates. However, this is not a major portion of the present invention and therefore detail description will be omitted.

As is apparent from FIG. 3, the respective partition plates 11 to 14 are integrated with the intermediate vertical frames 3a to be a strength member which serves to enhance rigidity of the housing 1; and the circuit breaker compartment upper partition plate 12, the circuit breaker compartment intermediate partition plate 13, and the circuit breaker compartment lower partition plate 14 constitute a part of a partition wall of the circuit breaker compartment 15 in which the circuit breakers are contained and these partition plates 12 to 14 also double as a partition wall which separates the circuit breaker compartment 15 from the main bus bar compartment 17. Then, the upper and lower bushings 18a, 18b are attached to these partition plate portions which are preliminarily positioned and arranged at the intermediate portion of the switchgear housing; and consequently, dimensional adjustment of the primary terminals is easy.

Furthermore, the above components occupying a large percentage of the mass of the switchgear are attached to the partition plate portions; and consequently, the major mass of the switchgear can be supported by the portions and it becomes possible to achieve an improvement in rigidity of the whole of the switchgear.

Figure 4:
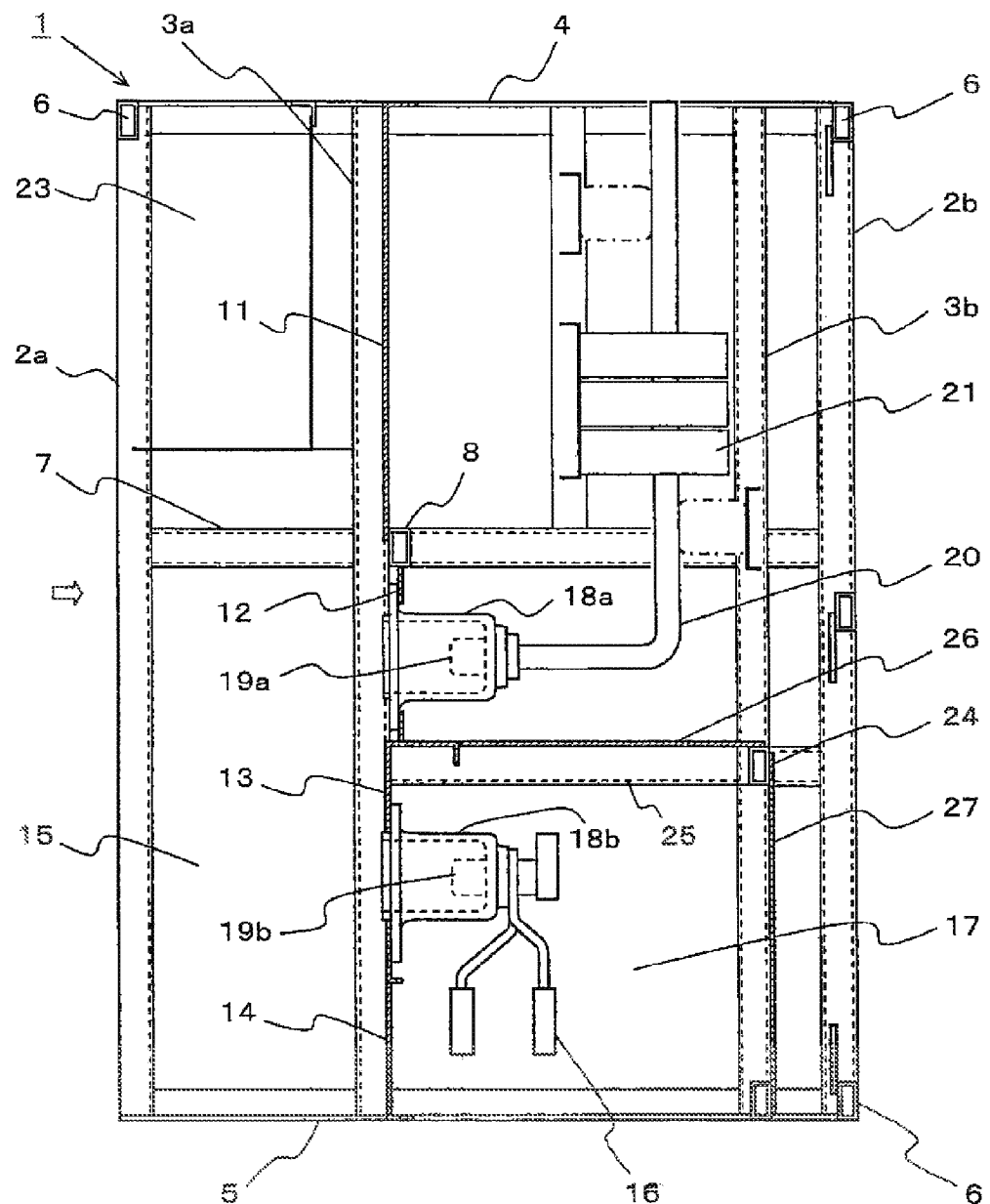
FIG. 4 is a side sectional view showing other example of the internal configuration of the switchgear according to Embodiment 1 of the present invention.

FIG. 4 is a side sectional view showing other example of an internal configuration of the switchgear. Portions equivalent to those in FIG. 3 are shown by the same reference numerals; their detail description will be omitted; and different points will be mainly described.

The configuration in which the upper partition plate 11 through the circuit breaker compartment lower partition plate 14 are fixed to the intermediate vertical frames 3a is the same as FIG. 3. A different point is the configuration of a main bus bar compartment partition plate which forms a space of the main bus bar compartment 17.

If the switchgear is increased in size, intermediate vertical frames 3b are also provided on the sides nearer to the vertical frames 2b on the rear side as shown in the drawing, other than the intermediate vertical frames 3a described so far. So, by using the intermediate vertical frames 3b, a width directional frame 24 and depth directional frames 25 are further added to the intermediate vertical frame 3b to use as attachment members of partition plates on the rear side of the main bus bar compartment 17.

That is, a main bus bar compartment upper partition plate 26 is attached to the width directional frame 24 and the depth directional frames 25 by welding or the like; and a main bus bar compartment rear partition plate 27 is attached to the width directional frame 24 and the intermediate vertical frames 3b by welding or the like. This forms the space of the main bus bar compartment 17, the space being surrounded by the circuit breaker compartment intermediate partition plate 13, the circuit breaker compartment lower partition plate 14, the main bus bar compartment upper partition plate 26, and the main bus bar compartment rear partition plate 27.

Incidentally, the main bus bar compartment rear partition plate 27 is formed with an inspection port (not shown) to which a cover (not shown) is usually attached.

In this manner, in the case where the added intermediate vertical frames 3b are provided on the more back side than the intermediate vertical frames 3a, the partition plates which constitute the main bus bar compartment 17 are attached by using the added intermediate vertical frames 3b. Consequently, the partition plates and the frames are integrated and rigidity is enhanced and therefore rigidity of the housing of the switchgear can be further improved.

The description so far has been made that the vertical frames and the width directional frames are each made of the hollow steel member and the upper and the lower depth directional frames are each made of the L-shaped steel member in cross section. However, materials of the frames are not limited to these members; and a hollow steel member, an L-shaped steel member, a channel steel member, an H-shaped steel member, and the like may be appropriately selected depending on the size of the housing, the amount of weight and the arrangement of the contained device, and the like. Furthermore, in the case of the hollow steel member, even a round shape in cross section, a triangle shape in cross section, and the like other than the rectangular shape in cross section may be permissible.

In this regard, however, the hollow steel member of the rectangular shape in cross section is preferable to be used for the intermediate vertical frame 3a portions on which at least the amount of weight is largely exerted; and the hollow steel member is better to be used for also the vertical frames 2a, 2b serving as brace members of the four corners. When an equilateral L-shaped steel member is compared to a square hollow steel member provided that the cross sectional side length and the cross sectional area of the steel members are the same, it is well known that the hollow steel member is larger in geometrical moment of inertia; and if the hollow steel member is used for a member on which the amount of weight is particularly exerted, it will be effective for an improvement in rigidity.

Next, description will be made on a fixing portion of the foundation, which is another characterizing portion of the present invention.

Figure 5:
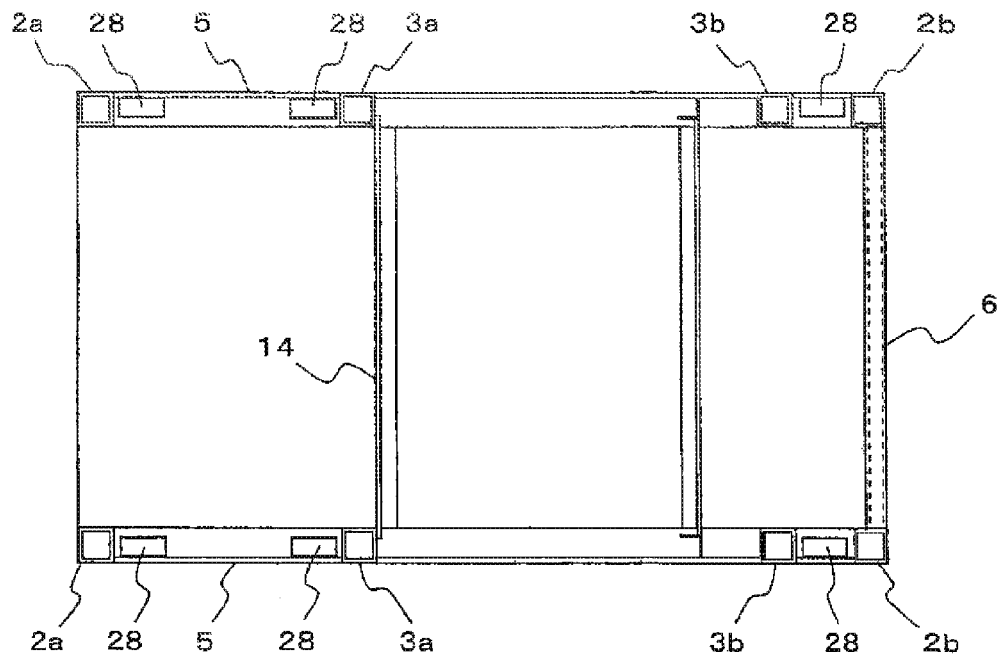
FIG. 5 is a plan view showing a floor portion of the housing of the switchgear according to Embodiment 1 of the present invention.

FIG. 5 is a plan view in which a floor portion of the housing 1 of the switchgear is seen from the upper side. As shown in FIG. 5, the depth directional frame 5, which is made of the L-shaped steel member arranged on the floor of the housing 1 of the switchgear, is formed with foundation welding holes 28 serving as fixing holes to be fixed to a foundation portion of the building side by welding. The foundation welding holes 28 are formed near lower portions of the vertical frames 2a, 2b and the intermediate vertical frames 3a, 3b, these frames 2a, 2b, 3a, 3b being constituted as the main framework of the housing 1 of the switchgear, that is, the foundation welding holes 28 are formed at positions adjacent to these frames. Usually, the vicinities of the vertical frame 2a, 2b of the four corners are fixed to the foundation; however, a characterizing portion of the present invention is that the foundation welding holes 28 are also certainly formed near the lower portions of the intermediate vertical frames 3a, which are arranged at the intermediate portions and to which the partition plates are fixed, so as to be fixed to the foundation.

Figure 6:
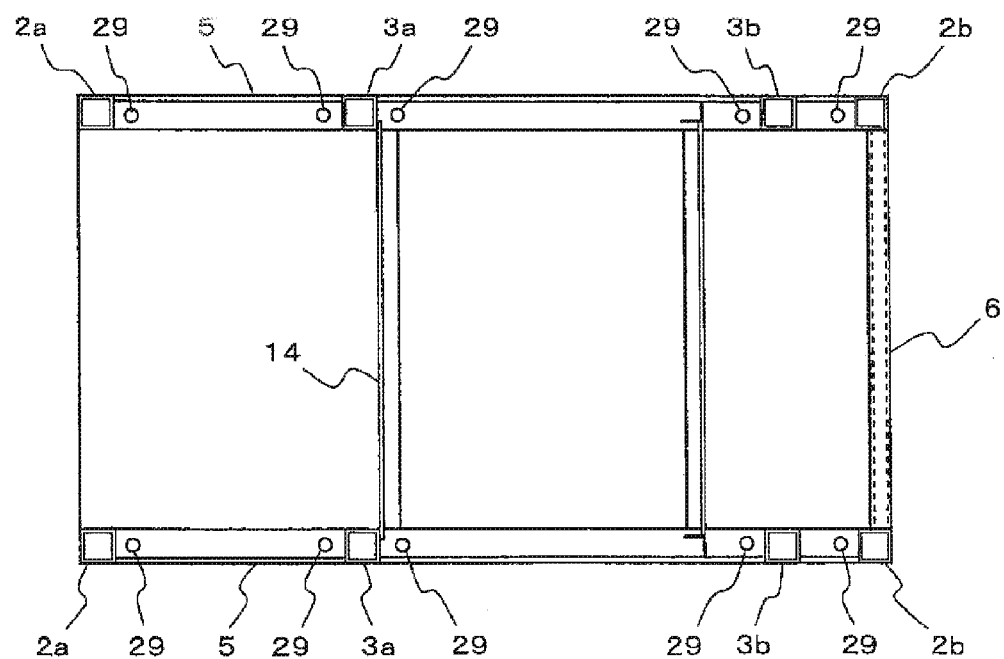
FIG. 6 is a plan view showing other example of the floor portion of the housing of the switchgear according to Embodiment 1 of the present invention.

FIG. 6 is other example of a fixing portion through which the housing 1 is fixed to the floor; and FIG. 6 is a plan view in which the floor portion of the housing 1 of the switchgear is seen from the upper side as in FIG. 5. Portions equivalent to those in FIG. 5 are shown by the same reference numerals and their detail description will be omitted.

As shown in the drawing, the depth directional frame 5, which is made of an L-shaped steel member arranged on the floor, is formed with foundation fastening holes 29 which are for fastening and fixing to the foundation portion of the floor of the building by bolts or the like. The foundation fastening holes 29 are formed near lower portions of the vertical frames 2a, 2b and intermediate vertical frames 3a, 3b, these frames 2a, 2b, 3a, 3b being constituted as the framework of the housing 1 of the switchgear, that is, the foundation fastening holes 29 are formed at portions adjacent to these frames, as in FIG. 5. In also this case, a characterizing portion of the present invention is that fixing holes 29 are certainly formed near the lower portions of the intermediate vertical frames 3a.

In this manner, fixation to the foundation is made near the main framework of the housing 1 and fixation is made by certainly forming the fixing holes near the lower portions of the intermediate vertical frames 3a to which the partition plates are fixed; and therefore, in addition to the aforementioned improvement in rigidity by providing the partition plates on the whole surfaces of the intermediate frames, rigidity at the time when the housing is installed on the foundation improves, whereby quake resistance can be improved.

Figure 7:
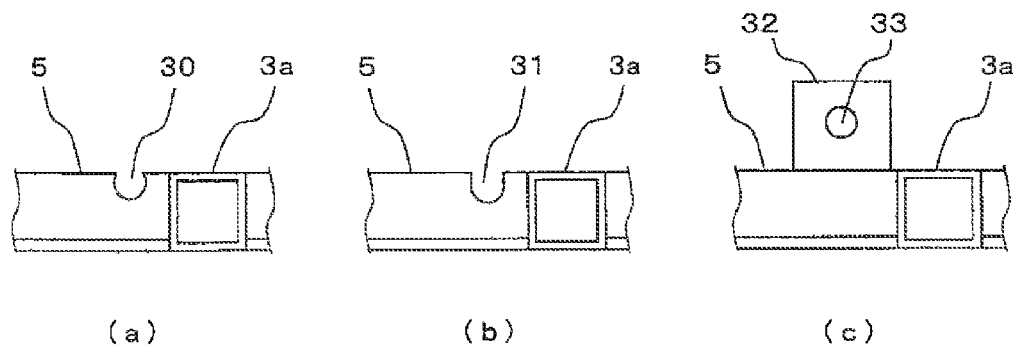
FIGS. 7(a) to 7(c) are partial plan views each showing other example of the fixing portion formed in the floor portion of the housing of the switchgear according to Embodiment 1 of the present invention.
Figure 8:
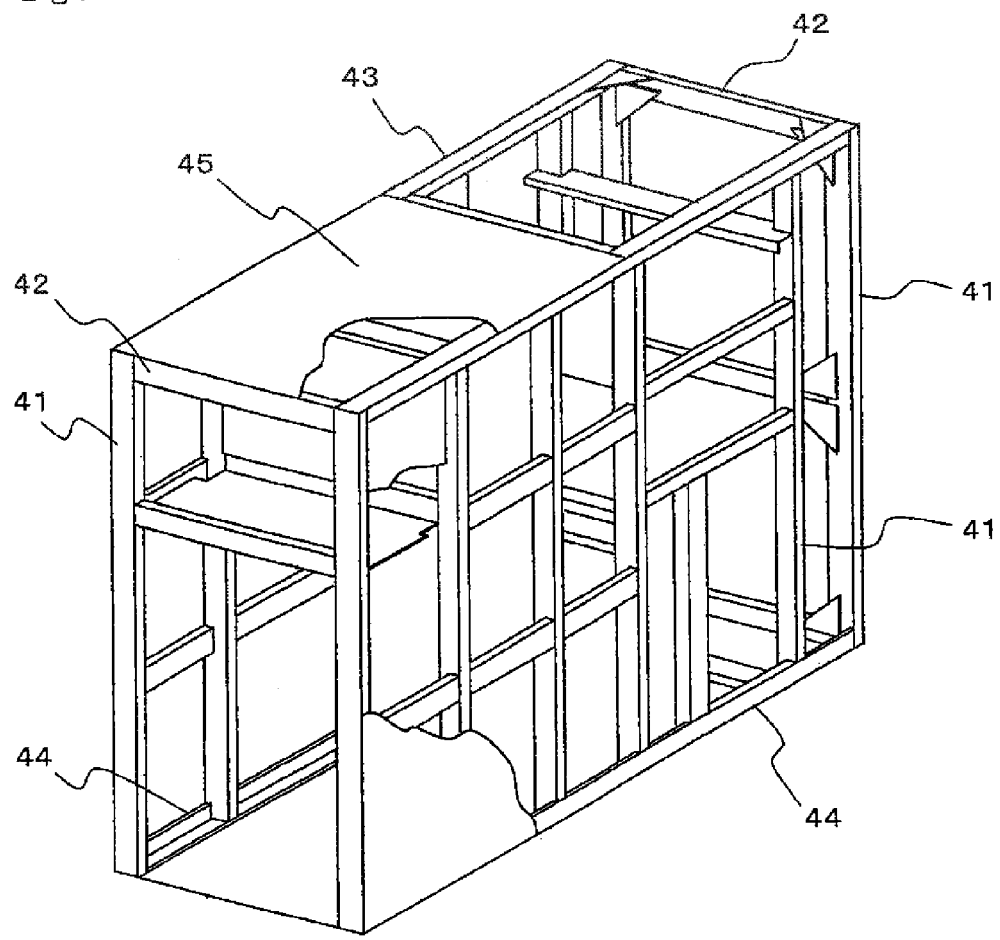
FIG. 8 is a perspective view showing a framework structure of a housing of a conventional switchgear.

FIGS. 7(a) to 7(c) are partial plan views each showing further other example of the foundation fixing portion. In the drawing, the vicinity of the lower portion of the intermediate vertical frame 3a is typically shown; however, other portions are also the same.

FIG. 7(a) shows that a foundation fastening cutout section 30 formed by cutting out a part of a through hole serves as a fixing portion; and FIG. 7(b) shows that a foundation fastening cutout section 31 formed by cutting out in a U-shape serves as a fixing portion. Allowance of position adjustment with a foundation bolt in the width direction of the housing 1 is increased by the cutout shape; and therefore, installation of the housing is easy.

FIG. 7(c) shows that a foundation fixing plate 32 of an added member is fixed to the depth directional frame 5, the foundation fixing plate 32 being formed with a foundation fastening hole 33. This case increases flexibility of arrangement of the foundation bolt to be installed to a foundation surface.

As described above, according to the switchgear of Embodiment 1, in the switchgear in which the main circuit devices including the circuit breakers and the control device for controlling the main circuit devices are contained in the cuboid shaped housing, the housing includes: the framework formed by joining the vertical frames to the depth directional frames and the width directional frames, the vertical frames being arranged in the standing condition at the four corners of the cuboid shape; at least the left and right pair of the intermediate vertical frames each provided at the intermediate portion in the depth direction of the housing; and the steel partition plates fixed over the whole in the vertical direction of the intermediate vertical frames, the partition plates being provided for separating the front and the back of the intermediate vertical frames. The intermediate vertical frames and the partition plates are integrated to constitute a reinforcement member; and the depth directional frames on the floor side of the housing are each formed with the fixing portion near the lower portion of at least the intermediate vertical frame to which the partition plates are provided, the fixing portion being provided for fixing the housing to the foundation surface; and therefore, rigidity of the intermediate portion of the housing whose load of the amount of weight is particularly large improves. Then, even when the dimensions and weight of the switchgear increase, a significant addition of framework members and an increase in size of the framework members are suppressed and rigidity of the housing can be maintained; and thus, an increase in cost can be suppressed.

Furthermore, the vicinity of the lower portion of the main framework of the housing of the switchgear, more particularly, the vicinity of the lower portion of the intermediate vertical frame to which the partition plates are fixed and on which the amount of weight is largely exerted is reliably fixed to the foundation; and therefore, rigidity of the switchgear improves and the switchgear excellent in quake resistance can be obtained.

Furthermore, the housing is separated by the partition plates into: the circuit breaker compartment which is located on the front of the partition plates and contains the circuit breakers and the main bus bar compartment which is located on the back and contains the main bus bars; and the bushings are attached to the partition plates for being connected to the circuit breakers and the main bus bars. Consequently, in addition to the aforementioned effects, the partition plates double as a partition plate which separates the circuit breaker compartment from the main bus bar compartment and therefore an added partition plate for partitioning does not need to be provided; and dimensional adjustment is easy and assembly work time can be shortened by further attaching the bushings of the main circuit to the partition plates.

Besides, among the respective frames which constitute the housing, at least the intermediate vertical frame to which the partition plates are provided uses a hollow steel member of a rectangular shape in cross section; and therefore, rigidity can be improved without increasing the weight of the housing.

DESCRIPTION OF REFERENCE NUMERALS

1 Housing 2a, 2b Vertical frame
3a, 3b Intermediate vertical frame
4, 5 Depth directional frame
6 Width directional frame
7 Intermediate depth directional frame
8 Intermediate width directional frame 9, 10 Reinforcement plate
11 Upper partition plate
12 Circuit breaker compartment upper partition plate
12a, 13a Opening portion
13 Circuit breaker compartment intermediate partition plate
13b, 14b Inspection port
14 Circuit breaker compartment lower partition plate
15 Circuit breaker compartment
16 Main bus bar
17 Main bus bar compartment
18a Upper bushing
18b Lower bushing
19a Upper primary terminal
19b Lower primary terminal
20 Upper conductor
21 Instrument current transformer
22 Main bus bar compartment partition plate
23 Controller compartment
24 Width directional frame
25 Depth directional frame
26 Main bus bar compartment upper partition plate
27 Main bus bar compartment rear partition plate
28 Foundation welding hole
29, 33 Foundation fastening hole
30, 31 Foundation fastening cutout section
32 Foundation fixing plate

The invention claimed is:

1. A switchgear in which main circuit devices including circuit breakers and a control device for controlling said main circuit devices are contained in a cuboid shaped housing, wherein said housing comprises:
   a framework formed by joining vertical frames to depth directional frames and width directional frames, said vertical frames being arranged in a standing condition at four corners of the cuboid shape;
   at least a left and right pair of intermediate vertical frames each provided at an intermediate portion in the depth direction of said housing; and
   steel partition plates fixed over the whole in the vertical direction of said intermediate vertical frames, said partition plates being provided for separating the front and the back of said intermediate vertical frames, and
   wherein said intermediate vertical frames and said partition plates are integrated to constitute a reinforcement member; and
   said depth directional frames on the floor side of said housing are each formed with a fixing portion near a lower portion of at least said intermediate vertical frame to which said partition plates are provided, the fixing portion being provided for fixing said housing to a foundation surface.

2. The switchgear according to claim 1,
   wherein said housing is separated by said partition plates into:
   a circuit breaker compartment located on the front of said partition plates, for containing said circuit breakers; and
   a main bus bar compartment located on the back, for containing main bus bars, and
   further comprising bushings attached to said partition plates, for being connected to said circuit breakers and said main bus bars.

3. The switchgear according to claim 1,
   wherein, among said respective frames which constitute said housing, at least said intermediate vertical frame to which said partition plates are provided uses a hollow steel member of a rectangular shape in cross section.

4. The switchgear according to claim 2,
   wherein, among said respective frames which constitute said housing, at least said intermediate vertical frame to which said partition plates are provided uses a hollow steel member of a rectangular shape in cross section.

5. The switchgear according to claim 2,
   wherein said partition plate has an opening portion, and said bushing is attached to the opening portion of said partition plate.

\* \* \* \* \*